US012786863B2

(12) United States Patent
Velev

(10) Patent No.: US 12,786,863 B2
(45) Date of Patent: Nov. 3, 2026

(54) APPARATUSES, METHODS, AND SYSTEMS FOR NETWORK SLICE ADMISSION CONTROL AND 5GC-EPC INTERWORKING

(71) Applicant: Lenovo (Singapore) Pte. Ltd., New Tech Park (SG)

(72) Inventor: Genadi Velev, Darmstadt (DE)

(73) Assignee: Lenovo (Singapore) Pte. Ltd., Singapore (SG)

(*) Notice: Subject to any disclaimer, the term of this patent is extended or adjusted under 35 U.S.C. 154(b) by 369 days.

(21) Appl. No.: 18/576,028

(22) PCT Filed: Jun. 30, 2022

(86) PCT No.: PCT/IB2022/056115
§ 371 (c)(1),
(2) Date: Jan. 2, 2024

(87) PCT Pub. No.: WO2023/275820
PCT Pub. Date: Jan. 5, 2023

(65) Prior Publication Data
US 2024/0406854 A1 Dec. 5, 2024

Related U.S. Application Data

(60) Provisional application No. 63/217,068, filed on Jun. 30, 2021.

(51) Int. Cl.
*H04W 48/18* (2009.01)
*H04W 28/20* (2009.01)

(52) U.S. Cl.
CPC ........... *H04W 48/18* (2013.01); *H04W 28/20* (2013.01)

(58) Field of Classification Search
CPC ..... H04W 48/08; H04W 48/16; H04W 48/18; H04W 36/144; H04W 36/13; H04W 36/0022; H04W 24/02
See application file for complete search history.

(56) References Cited

U.S. PATENT DOCUMENTS

2019/0124561 A1 4/2019 Faccin et al.
2019/0357130 A1* 11/2019 Garcia Azorero .... H04W 12/06
(Continued)

FOREIGN PATENT DOCUMENTS

CN 111226449 A 6/2020
CN 111226472 A 6/2020
(Continued)

OTHER PUBLICATIONS

PCT/IB2022/056115, "Notification of Transmittal of the International Search Report and the Written Opinion of the International Searching Authority, or the Declaration", International Searching Authority, Oct. 13, 2022, pp. 1-15.
(Continued)

*Primary Examiner* — Mahran Y Abu Roumi
(74) *Attorney, Agent, or Firm* — Kunzler Needham & Hilton; Bruce R. Needham

(57) ABSTRACT

Methods and entities for network slice admission control and 5GC-EPC interworking. A method includes receiving a first message requesting to establish a protocol data unit (PDU) session from a user equipment (UE). The first message is received from an entity disposed in an evolved packet core (EPC) and a 5G core (5GC). The method includes determining to send an update request to a NSACF entity to add the UE to UEs registered with a network slice responsive to the source network entity and sending a second message to the NSACF entity requesting an increase of the number of UEs with the network slice associated with the network slice. The second message includes at least one of a core network type parameter or an access type parameter, both used currently by the UE to establish the PDU session.

20 Claims, 8 Drawing Sheets

(56) References Cited

U.S. PATENT DOCUMENTS

| | | | | |
|---|---|---|---|---|
| 2019/0394833 | A1* | 12/2019 | Talebi Fard | H04W 76/11 |
| 2021/0153268 | A1 | 5/2021 | Lee et al. | |
| 2022/0361093 | A1* | 11/2022 | Kiss | H04W 48/16 |
| 2024/0259932 | A1* | 8/2024 | Ianev | H04W 24/02 |
| 2024/0276350 | A1* | 8/2024 | Foti | H04W 48/08 |
| 2024/0292281 | A1* | 8/2024 | Ianev | H04W 36/00222 |
| 2024/0373481 | A1* | 11/2024 | Ianev | H04L 41/0816 |

FOREIGN PATENT DOCUMENTS

| | | | |
|---|---|---|---|
| WO | 2019076439 | A1 | 4/2019 |
| WO | 2019078964 | A1 | 4/2019 |
| WO | 2020098954 | A1 | 5/2020 |

OTHER PUBLICATIONS

Ericsson, "S-NSSAI rejected due to maximum number of UEs reached", 3GPP TSG-CT WG1 Meeting #129-e C1-212182, Apr. 19-23, 2021, pp. 1-105.

Lenovo et al., "Introduction of Network Slice Admission Control (NSAC) feature—mixed model of operations", 3GPP TSG-SA WG2 Meeting #143E e-meeting S2-2100932, Feb. 24-Mar. 9, 2021, pp. 1-16.

3GPP, "3rd Generation Partnership Project; Technical Specification Group Services and System Aspects; System architecture for the 5G System (5GS); Stage 2 (Release 16)", 3GPP TS 23.501 V16.8.0, Mar. 2021, pp. 1-451.

3GPP, "3rd Generation Partnership Project; Technical Specification Group Services and System Aspects; Procedures for the 5G System (5GS); Stage 2 (Release 17)", 3GPP TS 23.502 V17.1.0, Jun. 2021, pp. 1-692.

* cited by examiner

APPARATUSES, METHODS, AND SYSTEMS FOR NETWORK SLICE ADMISSION CONTROL AND 5GC-EPC INTERWORKING

CROSS-REFERENCE TO RELATED APPLICATIONS

This application claims priority to U.S. Patent Application Ser. No. 63/217,068 entitled "APPARATUSES, METHODS, AND SYSTEMS FOR NETWORK SLICE ADMISSION CONTROL AND 5GC-EPC INTERWORKING" and filed on Jun. 30, 2021 for Genadi Velev, which is incorporated herein by reference in its entirety.

FIELD

The subject matter disclosed herein relates generally to wireless communications and more particularly relates to apparatuses, method, and systems for network slice admission control and 5$^{th}$ generation core network (5GC)-evolved packet core (EPC) interworking.

BACKGROUND

In certain wireless communications networks, control of network slice administration is performed. However, network slice administration is incomplete when user equipment is changing network connections between 5GC and EPC networks.

BRIEF SUMMARY

Methods for performing network slice admission control and 5GC-EPC interworking. Apparatuses, systems, and network entities also perform the functions of the methods. One embodiment of a method includes receiving a first message requesting to establish a protocol data unit (PDU) session from a user equipment (UE), wherein the first message is received from a source network entity chosen from an evolved packet core (EPC) or a 5G core (5GC). The method also includes determining to perform a network slice availability check procedure to add the UE to UEs registered with a network slice identified by a single network slice selection assistance information (S-NSSAI) responsive to the source network entity and sending a second message to a network slice access control function (NSACF) entity requesting an increase of the number of UEs with the network slice associated with the network slice (S-NSSAI), wherein the second message includes at least one of a core network type parameter or an access type parameter, both used currently by the UE to establish the PDU session.

One network entity for performing network slice admission control and 5GC-EPC interworking includes a receiver, a transmitter, a processor, and a memory that stores code executable by the processor. The codes causes the processor to receive a first message requesting to establish a PDU session from a UE, wherein the first message is received from a source chose from an EPC NF entity and a 5GC NF entity, determine to perform a network slice availability check procedure to add the UE to UEs associated with a network slice identified by a single network slice selection assistance information, responsive to the source of the first message, and send a second message to an NSACF entity requesting an increase of the number of UEs with the network slice associated with the network slice, wherein the second message includes at least one of a core network type parameter or an access type parameter, both used currently by the UE based on the first message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
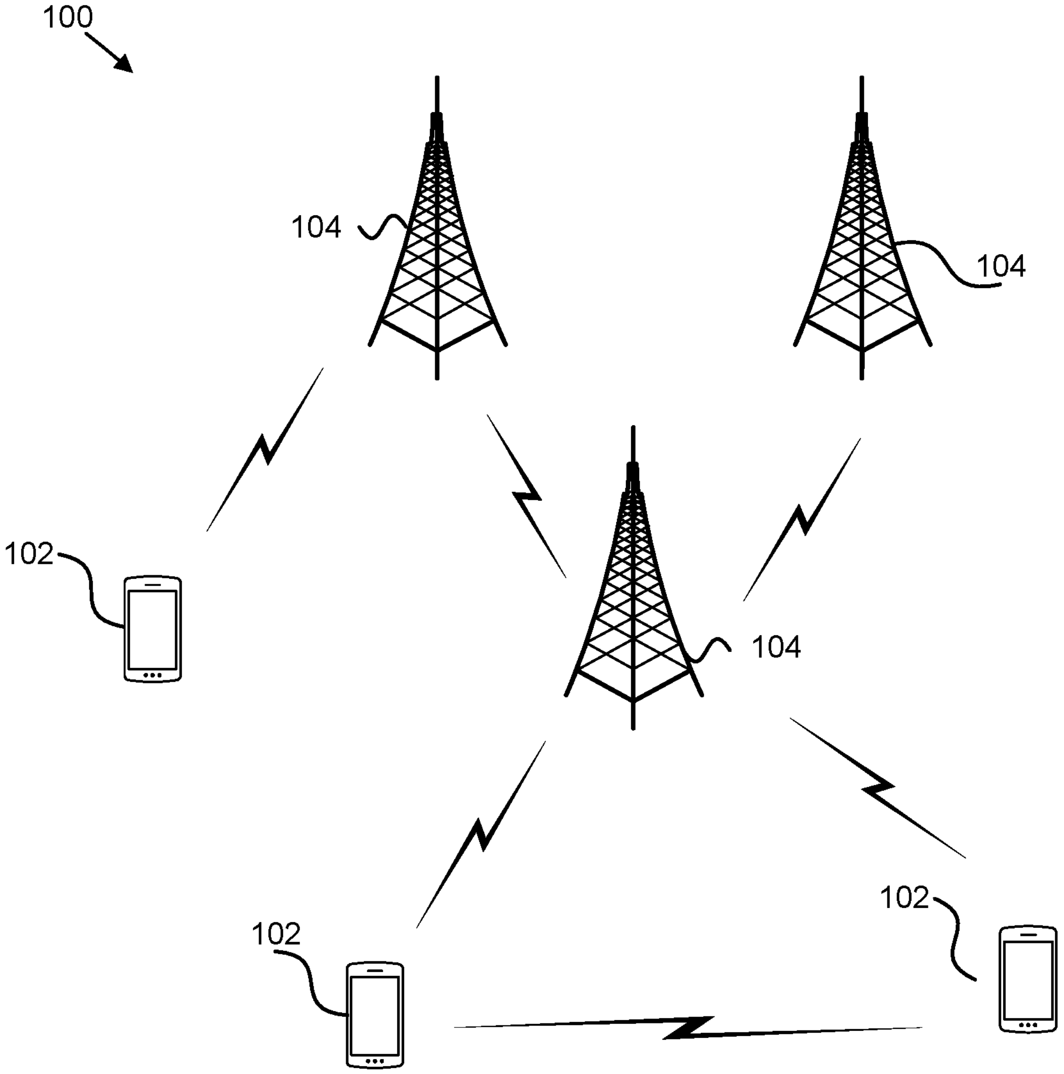
FIG. 1 is a schematic block diagram illustrating one embodiment of a wireless communication system for network slice admission control and 5GC-EPC interworking.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for network slice admission control and 5GC-EPC interworking. In one embodiment, the wireless communication system 100 includes remote units 102 and network units (entities) 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may be used for network slice admission control and 5GC-EPC interworking.

In certain embodiments, a network unit 104 may be used for network slice admission control and 5GC-EPC interworking.

Figure 2:
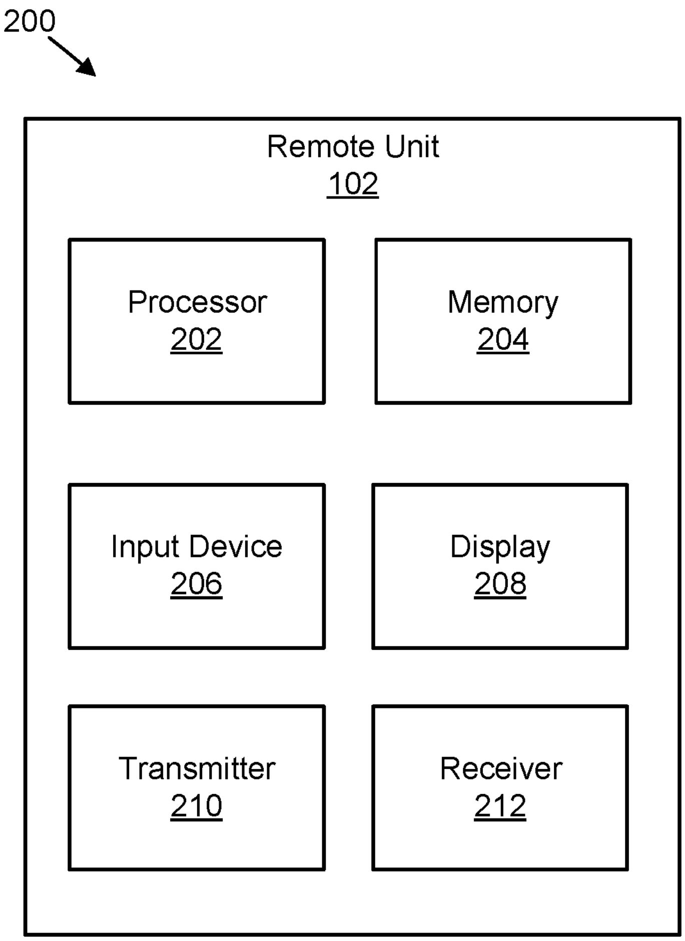
FIG. 2 is a schematic block diagram illustrating one embodiment of an apparatus that may be used for network slice admission control and 5GC-EPC interworking.

FIG. 2 depicts one embodiment of an apparatus 200 that may be used for network slice admission control and 5GC-EPC interworking. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
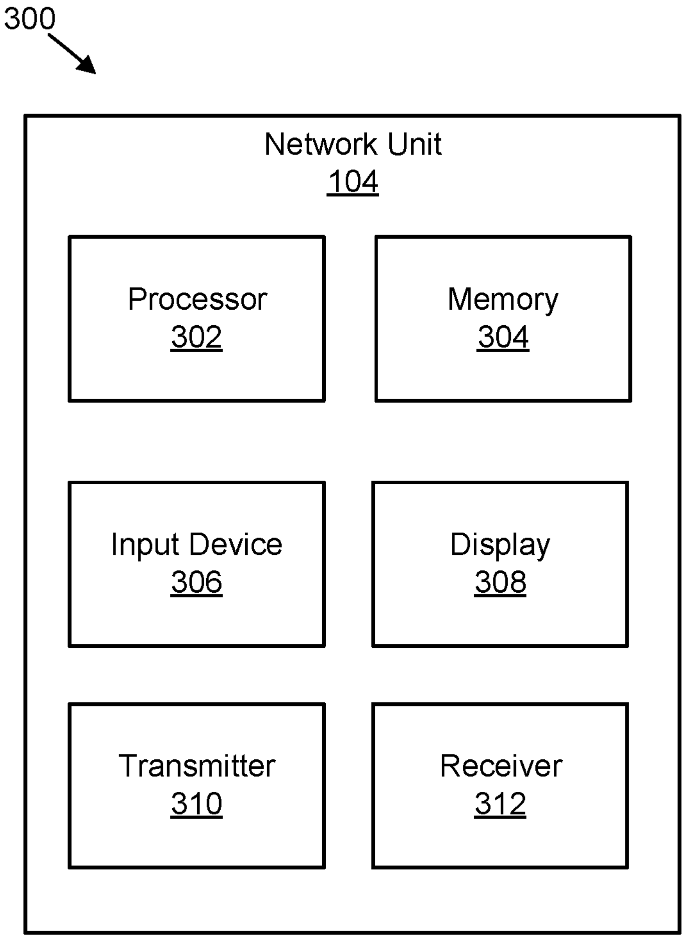
FIG. 3 is a schematic block diagram illustrating another embodiment of an apparatus that may be used for network slice admission control and 5GC-EPC interworking.

FIG. 3 depicts one embodiment of an apparatus 300 that may be used for network slice admission control and 5GC-EPC interworking. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

FIGS. 4 through 7 illustrate various embodiments described herein.

Figure 4:
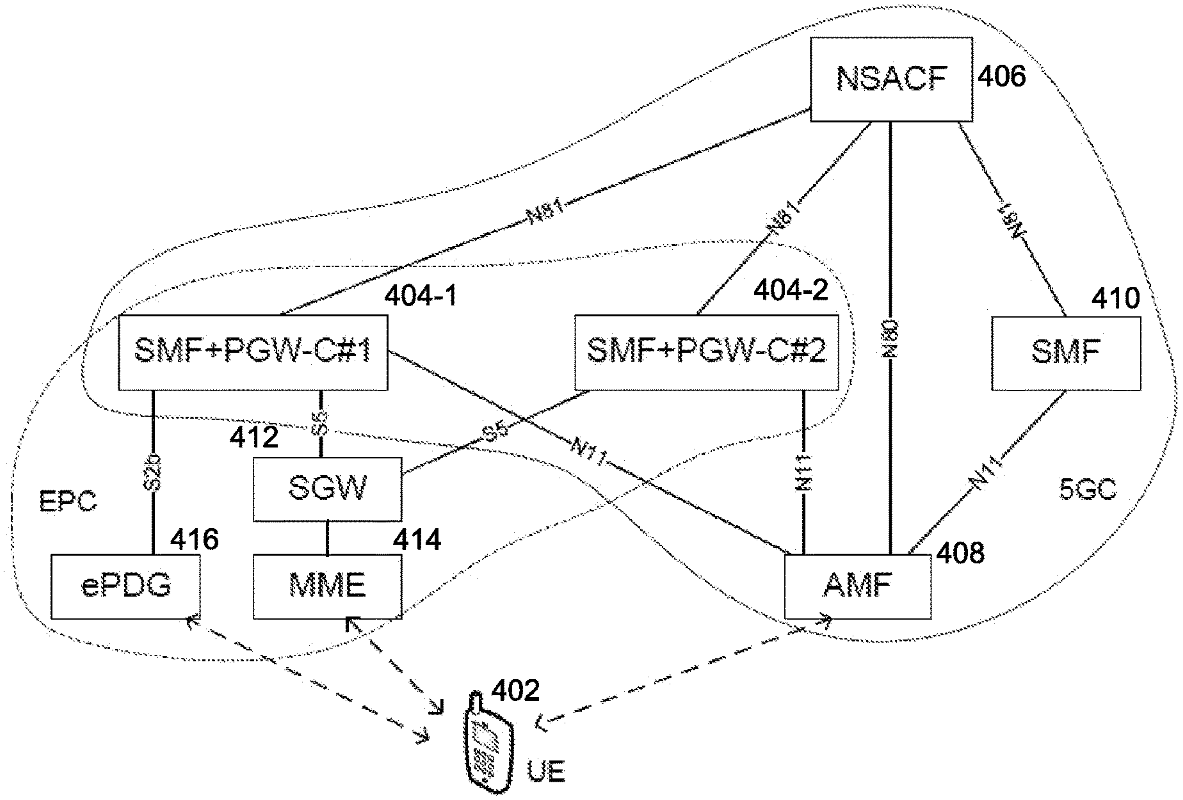
FIG. 4 is a schematic block diagram illustrating one embodiment of a wireless communication system for network slice admission control and 5GC-EPC interworking.

Referring to FIG. 4, an exemplary network 400 includes a UE 402 that registers with the network 400 via an evolved packet core (EPC) 420 (used interchangeably with evolved packet system (EPS)) or a $5^{th}$ generation core network (5GC) 430 (used interchangeably with $5^{th}$ generation system (5GS)). The 5GC 430 includes at least an access and mobility management function (AMF) entity 408 that communicates with the UE 402 via the control plane signaling and with a session management function (SMF) entity 410. The SMF entity 410 communicates with a network slice admission control function (NSACF) entity 408 for network slice admission control functionality.

The EPC 420 includes at least a mobility management entity (MME) 414 (for $3^{rd}$ generation partnership project (3GPP) access) that communicates with the UE 402 via control plane signaling. The MME 414 communicates with a serving gateway (SGW) entity 412, which communicates with one or more SMF+packet data network (PDN) gateway control plane function (SMF+PGW-C) entities 404-1, 404-2. The SMF+PGW-C entity 404-1, 404-2 provides interworking between the 5GC 430 and the EPC 420 and may implement functionality of SMF performed at the SMF entity 410 and functionality of PGW-C. The EPC 420 may also include an evolved packet data gateway (ePDG) entity 416 (for untrusted non-3GPP access type) that communicates with the UE 402 via control plane signaling and user plane data exchange and the SMF+PGW-C entity 404-1. In other words, the FIG. 4 represents the control plane architecture of the 4G/EPC and 5G networks. The combination of MME, SGW, ePDG and SMF+PGW-C entities represent an EPC architecture, whereas the combination of AMF, SMF, SMF+PGW-C and NSACF entities represent the 5GC architecture.

The SGW entity 412 connects with the SMF+PGW-C entity 404-1, 404-2 via an S5 interface, specifically via an S5-C interface. The AMF entity 408 connects with the SMF+PGW-C entity 404-1, 404-2 (used for data sessions for which interworking between the EPS 420 and the 5GS 430 is used) via an N11 interface and with the SMF entity 410 (used for the 5GS 430 only data sessions, i.e., protocol data update (PDU) sessions) via the N11 interface. For the purpose of network slice admission control (NSAC) for controlling maximum UEs in (MaxNrUEs) and/or maximum of PDU sessions (MaxNrOfPDUSessions) in a network slice, the following interfaces are introduced:

- N81 interface connects the SMF+PGW-C entities 404-1, 404-2 to the NSACF entity 406: and
- N80 interface connects the AMF entity 408 and the NSACF entity 406. The N80 interface offers services for NSAC for controlling MaxNrUEs.

A network slice identified by Single Network Slice Selection Assistance Information (S-NSSAI) can be a subject to NSAC. The NSAC allows the use of the network slice (S-NSSAI) resources up to a maximum number of registered UEs and/or a maximum number of established PDU sessions in the network slice (S-NSSAI). If the maximum number of registered UEs and/or established PDU sessions in the network slice (S-NSSAI) are reached, then new UEs or PDU sessions are rejected.

The NSACF entity 406 monitors and controls the number of registered UEs per network slice for the network slices that are subject to NSAC. The NSACF and AMF are configured via an operations, administration and management (OAM) system that a network slice S-NSSAI is subject to NSAC. The NSACF entity 406 is configured with the maximum number of registered UEs and/or established PDU sessions which are allowed to be served by the network slice (S-NSSAI) that is subject to NSAC.

The NSACF entity 406 controls (i.e., increase or decrease) the current number of UEs registered with a network slice so that the current number of UEs does not exceed the maximum number of UEs allowed to register with that network slice. The NSACF entity 406 also maintains a list of UE identities (IDs) registered with a network slice that is subject to NSAC. When the current number of UEs registered with a network slice is to be increased, the NSACF entity 406 first checks whether the UE ID is already in a list of UEs registered with that network slice and if not, it checks whether the maximum number of UEs per network slice for that network slice has already been reached.

The UE 402 may register with the 5GS 430 via the AMF entity 408 (e.g. using 3GPP or non-3GPP access) and with the EPS 420 via the MME entity 414, the ePDG entity 416, or via trusted non-3GPP access (not shown). The UE 402 is allowed to use one or more network slices (e.g. identified by S-NSSAI #1, S-NSSAI #2, etc.). Some of the network slices may be subject to NSAC.

The AMF entity 408 sends a request to the NSACF entity 406 when the UE 402 registers with or deregisters from the network slice (S-NSSAI) subject to NSAC, i.e., during a UE Registration procedure. The following are procedures used by a network function (NF) producer (e.g., the AMF entity 408, the SMF entity 410, or the SMF+PGW-C entities 404-1, 404-2) to update the NSACF entity 406 for NSAC:

- NSAC for the maximum number of registered UEs (MaxNrUEs) procedure (i.e., number of UEs per network slice availability check and update procedure.)
- NSAC controls maximum number of PDU sessions (or PDN connections) or a number of PDU sessions per network slice availability check and update procedure (MaxNrOfPDUSessions).

The SMF+PGW-C entity 404-1, 404-2 performs the procedure of NSAC for MaxNrUEs and the procedure of NSAC for MaxNrOfPDUSessions, when the UE 402 uses the EPS 420. In contrary, when the UE 402 uses the 5GS 430, the AMF entity 408 performs the procedure of NSAC for MaxNrUEs and the SMF entity 410 or the SMF+PGW-C entity 404-1, 404-2 perform the procedure of NSAC for MaxNrOfPDUSessions.

Each NF responsible for updating the NSACF entity 406 (e.g. the AMF entity 408, or the SMF+PGW-C entity 404-1, 404-2) can send an update request to the NSACF entity 406 to update, i.e. increase or decrease, the number of UEs when the UE 402 registers or deregisters with the NF (in case of the AMF entity 408 being responsible) or when a PDN connection is established or released in the EPC 420 (e.g. in case of the SMF+PGW-C 404-1, 404-2 being responsible). The NSACF entity 406 may store multiple entries for the same UE (e.g., based on the UE-ID included in the signaling from the AMF 408 or the SMF+PGW-C 404-1, 404-2), but the NSACF entity 406 counts the UE 402 only once or according to internal policies of the NSACF.

Also, the UE 402 may be registered with the network (e.g., 5GS) with a network slice (S-NSSAI) subject to NSAC with different access types, e.g., via 3GPP access and/or non-3GPP access. The UE 402 may be registered with the same AMF entity 408 or different AMFs (in case of different public land mobile networks (PLMNs)). When the AMF entity 408 sends an update request message to the NSACF entity 406 for increasing or decreasing the number of UEs, the AMF entity 408 includes the access type (AT) (i.e., 3GPP access, non-3GPP access, or both).

The NSACF entity 406 may store UE ID with the associated AT (i.e., there may be multiple entries in the NSACF entity 406 associated with the same UE ID but different AT). The NSACF entity 406 takes AT into account for increasing and decreasing the number of UEs using the network slice (S-NSSAI) subject to NSAC.

In one embodiment, the NSAC is differentiated depending on the different ATs and/or core network types (CNTs) which are configured in the NSACF entity 406. Example ATs include 3GPP and non-3GPP. Example CNTs include EPC/EPS and 5GS. For example, the NSACF entity 406 may be configured with different maximum numbers of UEs or PDU sessions for 3GPP access and non-3GPP access, or for EPC and 5GC. The information about which AT and CNT the UE 402 currently uses is provided to the NSACF entity 406 for any of the NSAC for MaxNrUEs or MaxNrOfPDUSessions. If the NSACF entity 406 rejects a request to use the network slice (S-NSSAI), the NSACF entity 406 in addition includes the specific AT value or CNT value, for which the rejected network slice (S-NSSAI) applies.

When the UE 402 is registered in the EPC 420 and the SMF+PGW-C entity 404-1, 404-2 is configured to perform NSAC for maximum number of UEs, the SMF+PGW-C entity 404-1, 404-2 sends the AT parameter in an update request to the NSACF entity 406 for MaxNrOfUEs. The SMF+PGW-C entity 404-1, 404-2 determines the AT based on the source entity/NF requesting the establishment of a data session (e.g., PDN connection). The update request to the NSACF entity 406 for MaxNrOfUEs may be to increase the number of UEs or to decrease the number of UEs. For example, if the SGW entity 412 requests the data connection via an S5 interface (or an S5-C interface), the SMF+PGW-C entity 404-1, 404-2 determines that the AT is 3GPP. If the data connection is requested via an S2b interface (e.g., from the ePDG entity 416) or via an S2a interface, the SMF+PGW-C entity 404-1, 404-2 determines that the AT is non-3GPP.

If the SMF entity 410 or the SMF+PGW-C entity 404-1, 404-2 is configured to perform NSAC for maximum number of PDU sessions, the SMF entity 410 or SMF+PGW-C entity 404-1, 404-2 includes the AT parameter in an update request to the NSACF entity 406 for MaxNrOfPDUSessions. The update request for MaxNrOfPDUSessions may be to increase the number of PDU sessions or to decrease the number of PDU sessions.

Furthermore, in order to allow the network 400 to differentiate the NSAC for a network slice (S-NSSAI) functionality to UEs registered with the EPC 420 and with the 5GC 430, the NSACF entity 406 is provided with information about the CNT. The NSAC requesting NF (AMF, SMF, or SMF+PGW-C) for any of MaxNrUEs or MaxNrOfPDUSessions includes the applicable CNT value in the update request to the NSACF entity 406.

The SMF+PGW-C entity 404-1, 404-2 can serve UEs registered with the 5GC and also attached to the EPC 420. If the SMF+PGW-C entity 404-1, 404-2 is configured to perform NSAC for maximum number of UEs, the SMF+PGW-C entity 404-1, 404-2 sends an update request to the NSACF entity 406 only in case that the requesting EPC NF entity (e.g. the SGW entity 410, the ePDG entity 416, trusted access, etc.) requests establishment of the data session (e.g. PDN connection). In other words, the SMF+PGW-C entity 404-1, 404-2 does not send an update request to the NSACF entity 406 for NSAC for MaxNrUEs, if the request to establish data connection (e.g., PDU session) is from the AMF entity 408 or via the N11 interface. If the SMF+PGW-C entity 404-1, 404-2 serves multiple data connections (e.g., PDN connections) associated with the same network slice (S-NSSAI) subject to NSAC, then the following applies:

- If NSAC for maximum number of UEs is configured, the SMF+PGW-C entity 404-1, 404-2 sends a request to the NSACF entity 406 for maximum number of UEs, an update type being set to "increase", only when the first data connection is established for the UE 402 at the SMF+PGW-C entity 404-1, 404-2. The SMF+PGW-C entity 404-1, 404-2 sends a request to the NSACF entity 406 for maximum number of UEs, the update type being set to "decrease", only when the last data connection is released for the UE 402 at the SMF+PGW-C entity 404-1, 404-2: and If NSAC for maximum number of PDU sessions is configured, the SMF+PGW-C entity 404-1, 404-2 sends a request to the NSACF entity 406 for each data connection (e.g., PDN connections, PDU sessions) establishment and release.

Update type is a parameter meaning whether the number of UEs registered with a network slice is to be increased or decreased.

Figure 5:
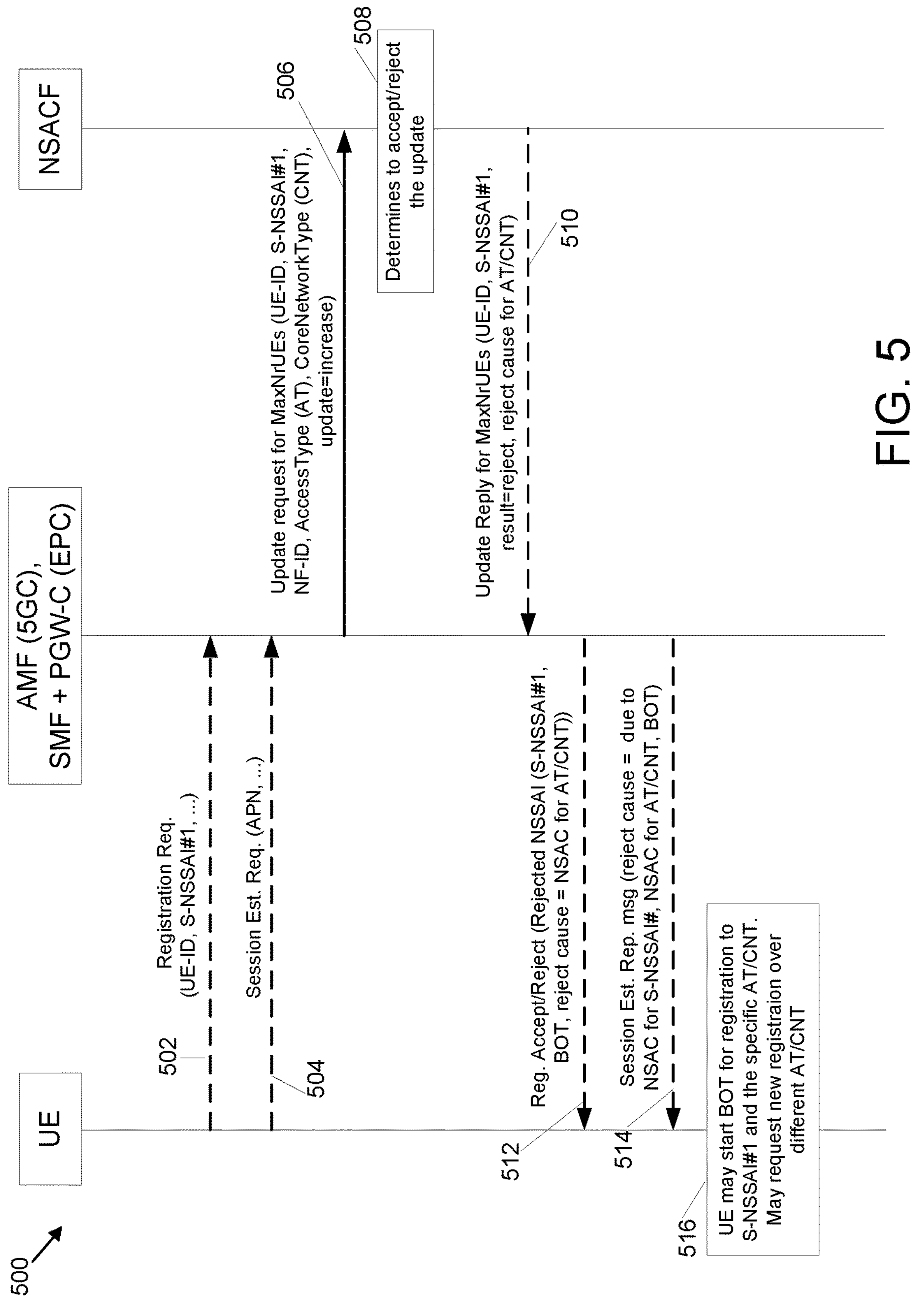
FIG. 5 is a communications flow diagram of one embodiment of performing a network slice request.

As shown in FIG. 5, NSAC for the maximum number of UEs (MaxNrUEs) considers the AT or CNT used currently by the UE. In other words, the NSACF applies differentiated counting of UEs or PDU sessions using an AT or a particular CNT.

The UE requests registration to the 5GS network or a data connection establishment in the EPS network using the non-access stratum (NAS) protocol. At a step 502, the UE sends a registration request message to the AMF in the 5GS. The registration request message may include at least the UE ID, the set of requested network slices (requested NSSAI) including one or more network slice IDs (S-NSSAIs) to which the UE wants to be registered. The AMF determines which AT the UE is using (e.g., AT is 3GPP or non 3GPP). At a step 504, the UE sends a session establishment request message, e.g., PDN connectivity request message to an SMF+PGW-C in the EPS. The message may include at least an access point name (APN), to which the UE wants to establish the data connection (e.g., PDN connection). Since the message is forwarded via an SGW or an ePDG, the SMF+PGW-C determines that the UE is requesting service via the EPS (i.e., the CNT would be EPC) and also which AT the UE is using. The SMF+PGW-C resolves from the subscription data received from unified data management (UDM)/home subscriber service (HSS) that the UE requested data/PDN connection is associated with a particular network slice, e.g., S-NSSAI #1, wherein it is assumed that the S-NSSAI #1 is subject to NSAC for either maximum number of UEs or maximum number of PDU Sessions or both.

The SMF+PGW-C applies the following behaviors:

(i) If there are more than one PDN connections associated with the network slice (S-NSSAI) and different SMF+PGW-Cs are serving the PDN connections, each SMF+PGW-C sends a request to the NSACF.

(ii) If a single SMF+PGW-C serves multiple PDN connections associated with the network slice (S-NSSAI), the SMF+PGW-C sends a single request for maximum number of UEs when establishing the first PDN connections or releasing the last PDN associated with the same UE.

At a step 506, the AMF (in 5GS) or SMF+PGW-C (in EPS) determines to trigger NSAC procedure for the maximum number of UEs (MaxNrUEs) based on configuration (local or by OAM system). For example, the AMF or SMF+PGW-C sends an update request message for MaxNrUEs including at least the following parameters: UE-ID, S-NSSAI #1, NF-ID, AT, CNT, update type.

NF-ID is the identifier of the network function which sends the request message to the NSACF. If there are multiple entries for the same UE ID at the NSACF, each entry is associated with a different NF ID.

At a step 508, the NSACF receives the update request message and checks internally the availability of the network slice (S-NSSAI) and whether the UE for the UE-ID is already registered with the network slice (S-NSSAI). If there is already an entry for the UE-ID and the NF-ID is different, the NSACF creates a new entry for the UE-ID. If the NSACF is configured to apply differentiated counting of UEs (in case of NSAC for MaxNrUEs) or PDU sessions (in case of NSAC for MaxNrOfPDUSessions) using a particular AT or a particular CNT, the NSACF uses the information about AT and CNT provided in step 506. The NSACF may be able to count the UEs or sessions for a particular S-NSSAI when the UEs use a particular core network type. If the maximum number of UEs or PDU sessions for EPC or for 5GC core network type has been reached, the NSACF can determined to reject new UEs or PDU sessions for the particular EPC or for 5GC core network type: and the NSACF indicates the core network type to the requesting NF (AMF or SMF+PGW-C).

At a step 510, the NSACF responds to the AMF or SMF+PGW-C with the result information whether the network slice is available or not available (i.e., rejected). For example, the NSACF sends update reply message for MaxNrUEs, whereas the message includes at least the following parameters: UE-ID, S-NSSAI #1, status, additional reject cause information for AT/CNT. The parameters UE-ID and the network slice (S-NSSAI) are described in step 506. The "status" parameter indicates whether the maximum number of UEs per network slice is reached or not. If the maximum number of UEs per network slice is reached (i.e., the request is rejected), the NSACF may send additional reject cause information to inform whether the maximum number of UEs is reached for a particular AT or for a particular CNT.

Then, the AMF or SMF+PGW-C sends a reply message to the UE with the result of the registration or PDN connection establishment. At a step 512, the AMF sends a registration accept or registration reject message to the UE. The message includes a rejected network slice (NSSAI) containing one or more rejected network slices (S-NSSAIs). For network slices (S-NSSAIs) rejected due to NSAC, the AMF includes in the reject information about the AT or the CNT. The reject message may also include a back-off timer (BOT) associated with the rejected network slice (S-NSSAI) for NSAC. At a step 514, the SMF+PGW-C sends NAS session establishment reply message, e.g., PDN connectivity reject message, to the UE. The reject message includes reject information that the data connection is rejected due to NSAC and in addition, it may include information about the AT or the CNT. The reject message may also include the BOT associated with the rejected network slice (S-NSSAI) for NSAC.

At a step 516, the UE stores the rejected network slice (S-NSSAI #1), and if the BOT is included, the UE starts the BOT for the associated network slice (S-NSSAI). In addition, if the reject information for the NSAC includes a specific AT or CNT, the UE may apply the BOT for the indicated AT value or CNT value. In other words, the UE may determine to attempt registration or data connection/session establishment to this network slice (S-NSSAI) via another AT or CNT, different from the indicated one.

Figure 6:
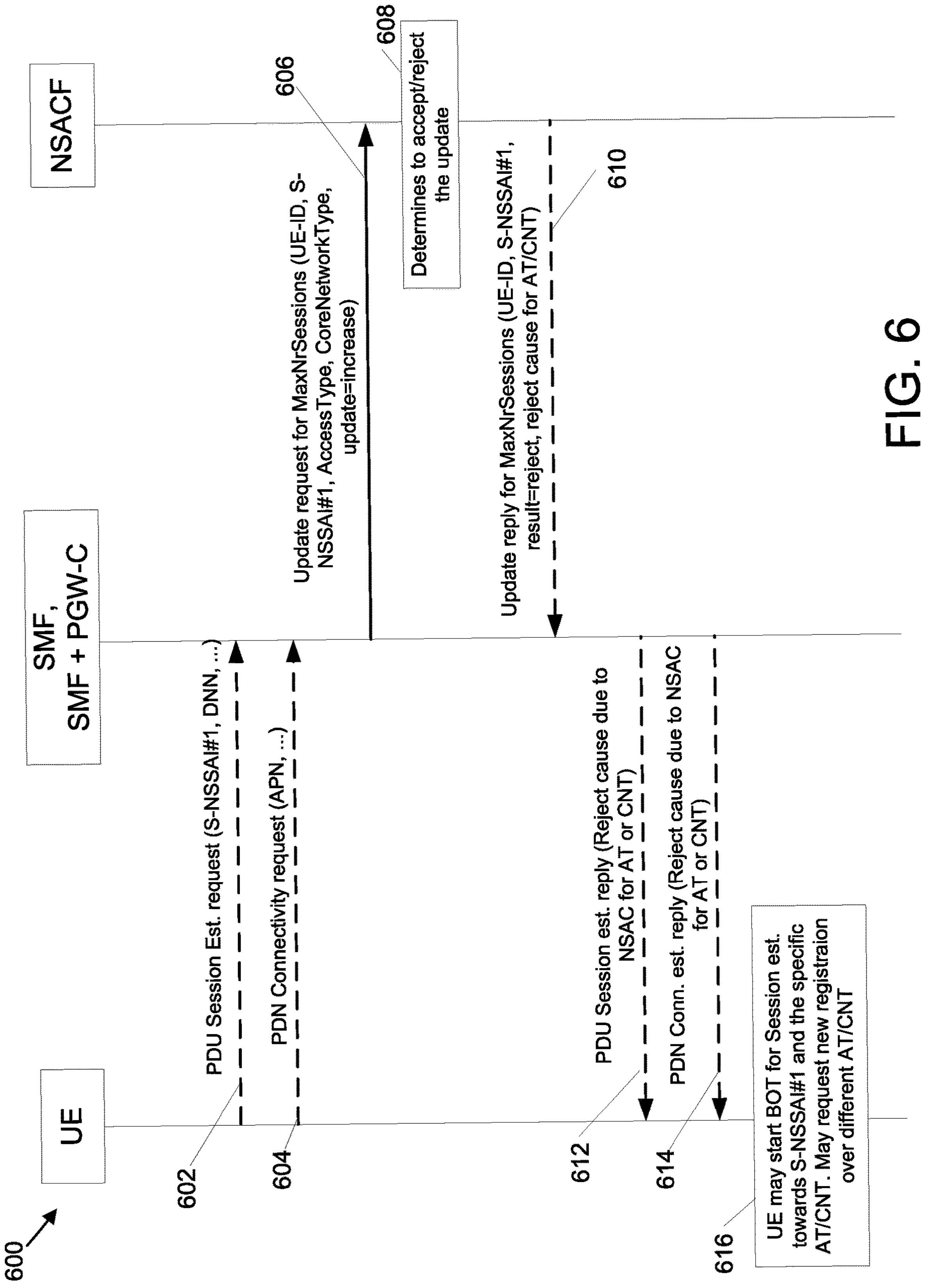
FIG. 6 is a communications flow diagram of one embodiment of performing a network slice request.

As shown in FIG. 6, an NSAC process 600 is performed for the MaxNrOfPDUSessions where the NSAC is applied specifically to an AT or a CNT. At a step 602, the UE requests establishment of data connection/session towards the 5GS network or the EPS network using the NAS protocol. The UE sends PDU session establishment request message to the SMF in the 5GS. The message may include at least the UE ID, the network slice IDs (S-NSSAI), and a data network name (DNN) to which the UE wants to establish the PDU session. The SMF is configured to apply NSAC for MaxNrOfPDUSessions for the network slice (S-NSSAI). The SMF determines which AT is used by the UE. At a step 604, the UE sends a session establishment request message, e.g., PDN connectivity request message to the SMF+PGW-C in the EPS. The message may include at least the APN, to which the UE wants to establish the data connection (e.g., PDN connection). The SMF+PGW-C is configured to apply NSAC for MaxNrOfPDUSessions for the network slice (S-NSSAI). Since the message is forwarded via SGW or ePDG, the SMF+PGW-C determines that the UE is requesting service via the EPS (i.e., the CNT is EPC) and also which AT the UE is using. The SMF+PGW-C resolves from subscription data received from UDM/HSS that the APN is associated with a particular network slice (e.g., S-NSSAI #1).

At a step 606, the SMF (in 5GS) or SMF+PGW-C (in EPS) determines to trigger NSAC procedure for the MaxNrOfPDUSessions based on configuration (local or by OAM system). For example, the SMF or SMF+PGW-C sends an update request message for MaxNrOfPDUSessions including at least the following parameters: UE-ID, S-NSSAI #1, NF-ID, AT, CNT, update type.

At a step 608, the NSACF receives the update request message and checks internally the availability of the network slice (S-NSSAI) and whether new PDU sessions can be established to the network slice (S-NSSAI #1), whereas also the AT and CNT may be considered.

At a step 610, the NSACF responds to the SMF or SMF+PGW-C with the result information whether the data connection/session can be accepted or rejected. For example, the NSACF sends update reply message for MaxNrOfPDUSessions, whereas the message includes at least the following parameters: UE-ID, S-NSSAI #1, status, additional reject cause information for AT/CNT. The status parameter indicates whether the maximum number of UEs per network slice is reached or not. If the maximum number of UEs per network slice is reached (i.e. the request is rejected), the NSACF may send additional reject cause information to inform whether the maximum number of Sessions is reached for a particular AT or for a particular CNT.

Then, the SMF or SMF+PGW-C sends a reply message to the UE with the result of the session/connection establishment. At step 612, the SMF sends a PDU session establishment accept or PDU session establishment reject message to the UE. If the reply message is for rejection, the reply message includes a rejected network slice(s) (S-NSSAI) and may include the reason, e.g., due to NSAC. In addition, the SMF may include reject information about the AT or the CNT. The reply message may also include a BOT associated with the rejected network slice (S-NSSAI) due to NSAC. At a step 614, the SMF+PGW-C sends NAS PDN connectivity reply message, e.g., PDN connectivity accept or reject message to the UE. If the message is for rejection, the message includes reject information that the data connection is rejected due to NSAC and in addition, it may include information about the AT or the CNT. The message may also include a BOT associated with the rejected network slice (S-NSSAI) due to NSAC.

At a step 616, the UE stores the information for the rejected data connection/session. For example, the UE stores the network slice (S-NSSAI #1), and if BOT is included, the UE starts BOT for the associated network slice (S-NSSAI). In addition, if the reject information for the NSAC includes a specific AT or CNT, the UE may apply the BOT for the indicated AT value or CNT value. In other words, the UE may determine to attempt a data connection/session establishment to the network slice (S-NSSAI) via another AT or CNT, different from the indicated one.

The NSAC can be applied specifically to an AT or CNT. In addition, the UE is informed that the rejection of registration or data connection/session establishment to a specific network slice (S-NSSAI) rejected due to NSAC applies to a particular AT or CNT. In other words, the UE is aware about the scope of applicability of NSAC and the UE may determine to attempt data registration or data connection/session establishment to this network slice (S-NSSAI) via another AT or CNT.

In various embodiment, the NSACF is explicitly informed about the reason for sending the update message requesting decrease from the updating NF (e.g., AMF, SMF+PGW-C, or SMF: also called NF consumer of NSAC service). The reason for update request message may be a "reason for decrease" and may be included in any of the service requests for NSAC for maximum number of UEs or NSAC for maximum number of PDU sessions. The update request message may include a "reason for decrease" (or deregistration cause) that may be derived in the updating NF in one of the following ways.

The AMF (e.g., or SMF+PGW-C) determines to send a request to the NSACF to decrease the number of UEs (i.e., to remove the UE from the UEs registered at the NSACF) for a particular access type, if the AMF receives a deregistration notification from the UDM for the access type and the UE context in the AMF contains an Allowed NSSAI including one or more S-NSSAI(s) subject to NSAC. The AMF may consider the deregistration reason sent in the deregistration notification from the UDM when determining whether to indicate the "reason for decrease". The following applies:

- If the deregistration reason received from the UDM indicates UE Registration area change or 5GS to EPS mobility, the AMF sends to the NSACF a request for decrease and indicates a deregistration cause=UE mobility (meaning that the UE has moved to another AMF).
  - The NSACF does not immediately delete the UE registration, but may keep it for a short time. This assures that a UE registration from another AMF or SMF+PGW-C would not be rejected by the NSACF due to reached maximum number of UE.
- If the deregistration reason received from the UDM indicates "UE initial registration" or "subscription withdrawn", the AMF may send the "reason for decrease" to the NSACF to remove all entries for the UE, i.e. the same UE-ID, as the UE is no longer subscribed with the network or the UE may have performed initial registered with a different network or different AMF.

The AMF (e.g., or SMF+PGW-C) determines to send a request to the NSACF to decrease the number of UEs (i.e. to remove the UE) when the UE sends a deregistration request. For the SMF-PGW-C or SMF or AMF:

- [for SMF-PGW-C] If the SMF-PGW-C is configured to apply NSAC for MaxNrUEs, determining to send an update request to the NSACF only if the first message is from EPC NF (e.g., SGW, ePDG, etc.). Determining that the UE is using the non-3GPP access, if the SMF-PGW-C receives a request to PDN connectivity from ePDG/PDG.

[for AMF, SMF-PGW-C, or SMF] Sending a request message to the NSACF to increase of the number of registered UEs or the number of Sessions with the network slice (S-NSSAI), wherein the message includes at least one of the parameters: CNT and AT.

[for AMF, SMF-PGW-C, or SMF] Receiving from NSACF a message to reject the use of the network slice (S-NSSAI) for MaxNrUEs or MaxNrOfPDUSessions, whereas the message includes information that the reject applies to a particular AT and/or CNT.

[for AMF, SMF-PGW-C, or SMF] sending information to UE (over NAS MM or SM message) to reject a network slice S-NSSAI due to NSAC and in addition information that the reject applies to a particular AT and/or CNT.

For the NSACF:

Receive an indication from requesting NF (e.g., from AMF, SMF or "SMF+PGW-C") for the CNT, wherein the indication can be received in update request for MaxNrOfUEs or update request for MaxNrOfPDUSessions. In addition, the NSACF may receive an indication for the AT.

Determine whether to apply the NSAC for the UE based on the maximum number of UE/PDU session for EPS or for 5GS or for the AT:

Send a response indicating the result:

If the maximum number of UE/PDU session is not reached, sending a positive result.

If the maximum number of UE/PDU session is reached for EPS or 5GS, sending a reject message or reject cause to the requesting NF (e.g., AMF, SMF or SMF+PGW-C) indicating that the reject is for a specific CNT, a specific AT, or both.

Figure 7:
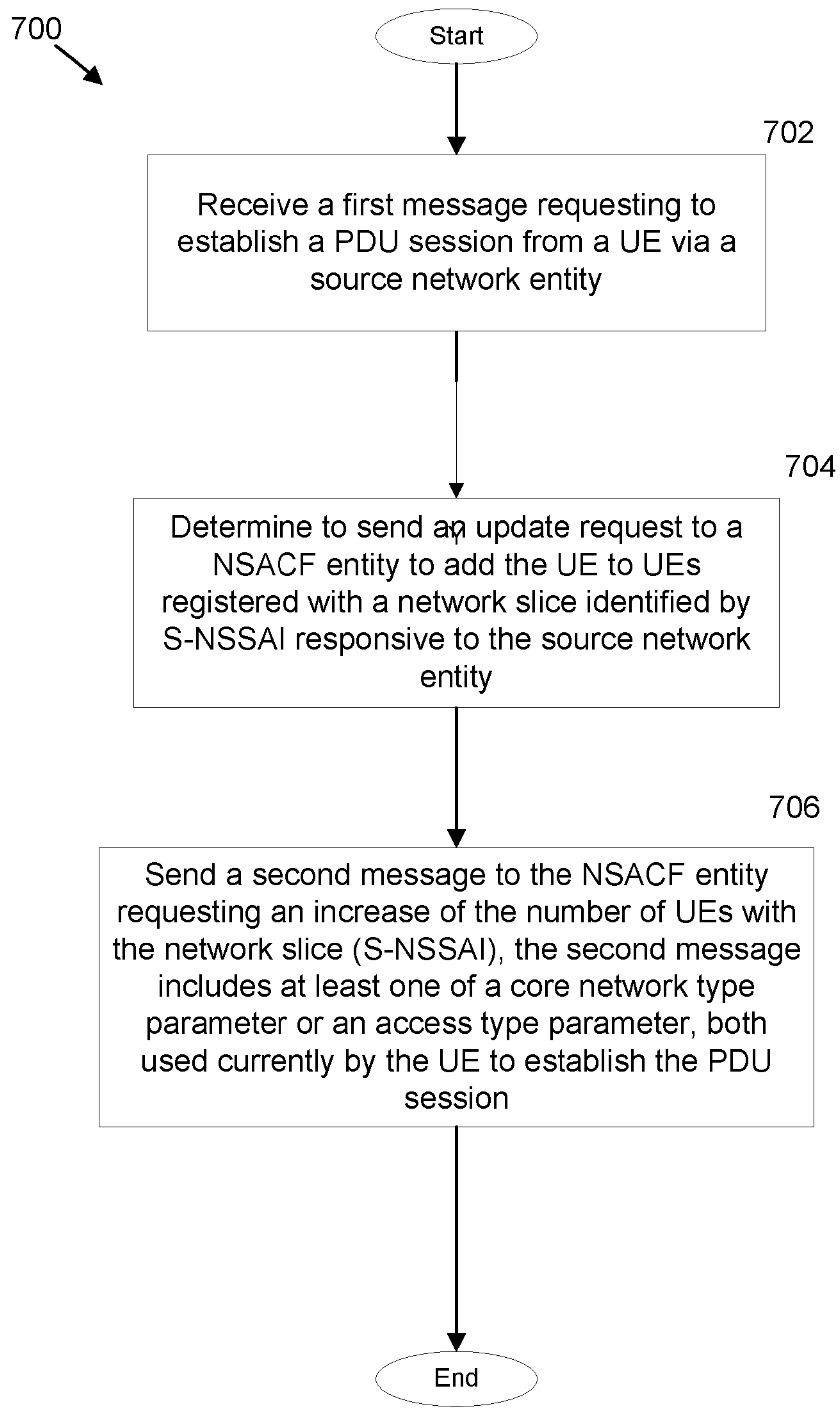
FIG. 7 is a flow diagram of a process of performing control of a network slice request.

Referring to FIG. 7, a flow diagram of a method 700 performed at an SMF+PGW-C (in EPS) network entity or SMF (in 5GS) network entity. At a block 702, a first message is received that requests to establish a PDU session from a UE via a source network entity. At a block 704, the method 700 determines to send an update request to a NSACF entity to add the UE to UEs registered with a network slice identified by S-NSSAI responsive to the source network entity. At a block 706, a second message is sent to the NSACF entity requesting an increase of the number of UEs with the network slice (S-NSSAI). The second message includes at least one of a core network type parameter or an access type parameter, both used currently by the UE to establish the PDU session.

Figure 8:
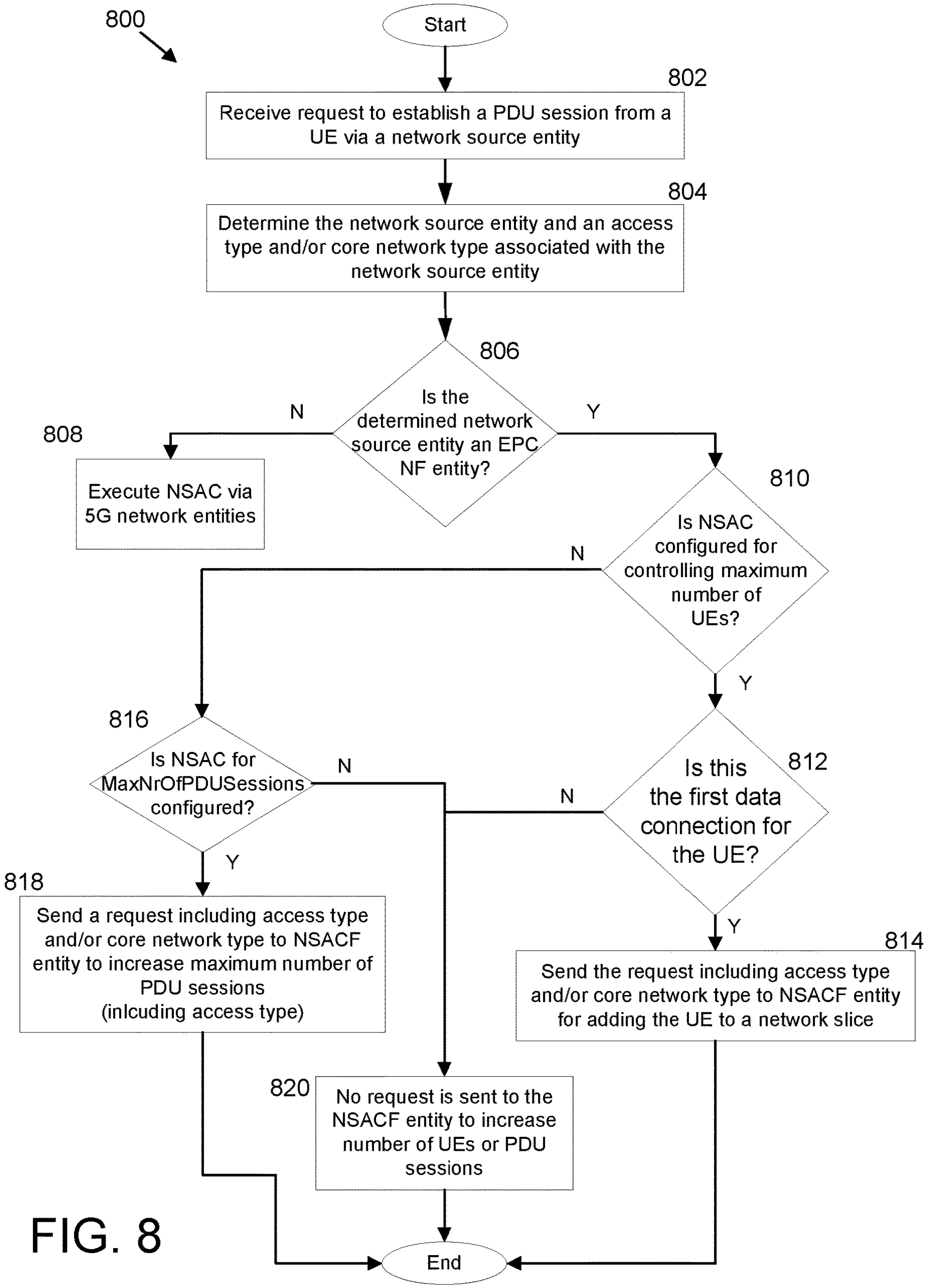
FIG. 8 is a flow diagram of a process of performing control of a network slice request.

Referring to FIG. 8, a flow diagram of a method 800 for an SMF+PGW-C (in EPS) or SMF (in 5GS) method. The SMF+PGW-C or SMF is configured to perform NSAC for a network slice (S-NSSAI) for at least one of MaxNrUEs or MaxNrOfPDUSessions. At a block 802, a request to establish a PDU session is received from a UE via a network source entity. At a block 804, the network source entity and an AT and/or a CNT associated with the network source entity are determined. At a block 806, the method 800 determines if the determined network source entity is an EPC NF entity. At a block 808, NSAC is executed via 5G network entities in response to the NSAC determining that the network source entity is not an EPC NF entity. At a block 810, the method 800 determines if NSAC associated with the request is configured for controlling maximum number of UEs. At a block 812, the method 800 determines if the request is for a first data connection for the UE. At a block 814, the request including AT and/or CNT is sent to an NSACF entity for adding the UE to a network slice in response to the request being the first data connection for the UE. At a block 816, the method 800 determines if NSAC for MaxNrOfPDUSessions configured regardless of the outcome of the block 810. At a block 818, the request including AT and/or CNT is sent to the NSACF entity to increase maximum number of PDU sessions (including access type). At a block 820, no request is sent to the NSACF entity to increase number of UEs or PDU sessions in response to the request not being the first data connection for the UE or the NSAC not being configured for MaxNrOfPDUSessions.

In one embodiment, a network operator may wish to count separately the registered UEs or established sessions/connections established in different core networks (e.g. EPC and 5GC) with a network slice (S-NSSAI) subject to NSAC. For example, there can be different maximum number of UEs configured in the NSACF for UEs registered with EPC and with 5GC, e.g., maximum number N for UEs registered with EPC and number M for UEs registered with 5GC. Similarly, there may be different maximum number of PDU sessions configured in the NSACF for sessions established in the EPC and in the 5GC. In other words, the use case is that the NSACF is able to differentiate whether the UE is registered in EPC or 5GC (for NSAC for MaxNrUEs), or whether the UE establishes a data session in EPC or 5GC (for NSAC for MaxNrOfPDUSessions). If this feature (i.e., of separate counting of registered UEs or established sessions/connections in EPS or 5GS) is enabled, the following may apply:

The requesting NFs (AMF, SMF, or SMF+PGW-C) and the NSACF are configured with this feature, e.g., by the OAM: or The NSACF is configured with this feature, e.g., by the OAM, and the NSACF sends configuration notification to the requesting NFs (AMF, SMF, or SMF+PGW-C) to include the CNT in the request to the NSACF.

The NSACF may implicitly (or locally within the NF) determine the type of core network by investigating the type of requesting NF (i.e., sending the request).

For example:

if the requesting NF is of type SMF+PGW-C and the request is for NSAC for MaxNrUEs, the NSACF determines that the UE is using EPC;

if the requesting NF is of type AMF and the request is for NSAC for MaxNrUEs, the NSACF determines that the UE is using 5GC: and if the requesting NF is of type SMF and the request is for NSAC for MaxNrOfPDUSessions, the NSACF determines that the UE is using 5GC.

if the requesting NF is of type SMF+PGW-C and the request is for NSAC for MaxNrOfPDUSessions, the NSACF is not able to implicitly determine the CNT. So, this case can be only solved by explicit indication for the CNT value sent from SMF+PGW-C to the NSACF.

The requesting NF (AMF, SMF, or SMF+PGW-C, i.e., the NF sending updated request) includes a parameter called CNT (or 'system type') of the network, to which the UE is registered. For example, the CNT can be EPC or 5GC.

The NSACF uses, receives, and stores the CNT parameter for each entry for a UE ID, since the NSACF may maintain and store multiple entries for the same UE, whereas the UE-ID is used as the key for each entry. It may be assumed that the same UE-ID is present in the multiple entries. The NSACF may apply different maximum number of UEs or PDU sessions for the different core network types or may count the UEs or PDU sessions together, depending on the network configuration and policies. The NSACF is able to differentiate the UE registrations in the EPS and in the 5GS.

ALTERNATE EMBODIMENTS

A. A method performed at a network entity linking a 4G network to a 5G network and in data communications with an NSACF entity, the method comprising: receiving a first message requesting to establish a PDU session from a UE, wherein the first message is received from a source chose from an EPC NF entity and a 5GC NF entity: determining to perform network slice availability check procedure to add the UE to UEs registered with a network slice identified by a single network slice selection assistance information (S-NSSAI) responsive to the source network entity: and sending a second message to an NSACF entity requesting an increase of the number of UEs with the S-NSSAI, wherein the second message includes at least one of a core network type parameter or an access type parameter, both used currently by the UE based on the first message.

B. The method of A, wherein determining to send the update message is further responsive to the source being disposed in the EPC and the network slice being subject to admission control for number of UEs.

C. The method of A or B, wherein the access type comprises 3GPP access type responsive to the first message being sent by an SGW entity or the access type comprises non-3GPP access responsive to the first message being sent by an ePDG entity.

D. The method of any of A-C, wherein the core network type comprises one of the EPC or the 5GC.

E. The method of any of A-D, further comprising determining not to send the second message to increase the number of UEs for the network slice identified by the network slice (S-NSSAI), if there is already an existing data session for the UE.

F. The method of any of A-E, further comprising: receiving a reject message for the UE from the NSACF entity, the reject message including an indication as to which access type or core network type the rejection applies: and sending the reject message to the UE with the indication as to which access type or core network type the rejection applies.

G. The method of any of A-F, further comprising: determining if the first message is a first data connection for the associated UE: wherein sending the second message the NSACF entity is performed in response to determining that the first message is the first data connection for the associated UE.

H. The method of any of A-G, further comprising sending a third message to the NSACF entity requesting an increase of the number of PDU sessions established in the network slice.

I. The method of H, wherein the third message is sent to the NSACF entity in response to the source network entity being disposed in the EPC and the network slice being subject to admission control for a maximum number of PDU Sessions.

J. The method of H or I, wherein the third message includes at least one of a core network type parameter or an access type parameter, both used currently by the UE to establish the PDU session.

K. A network entity comprising: a receiver: a transmitter; a processor; and a memory that stores code executable by the processor to: receive a first message requesting to establish a PDU session from a UE, wherein the first message is received from a source chose from an EPC NF entity and a 5GC NF entity: determine to perform a network slice availability check procedure to add the UE to UEs associated with a network slice identified by a single network slice (S-NSSAI), responsive to the source of the first message; and send a second message an NSACF entity requesting an increase of the number of UEs with the network slice associated with the S-NSSAI, wherein the second message includes at least one of a core network type parameter or an access type parameter, both used currently by the UE based on the first message.

L. The network entity of K, wherein the access type comprises 3GPP access type responsive to the first message being sent by an SGW entity.

M. The network entity of K or L, wherein the access type comprises non-3GPP access responsive to the first message being sent by an ePDG entity.

N. The network entity of any of K-M, wherein the core network type comprises one of the EPC or the 5GC.

O. The network entity of any of K-N, wherein the code is further executable by the processor to: receive a reject message for the UE from the NSACF entity, the reject message including an indication as to which access type or core network type the rejection applies: and send the reject message to the UE with the indication as to which access type or core network type the rejection applies.

P. The network entity of any of K-O, wherein: the code is further executable by the processor to determine if the first message is a first data connection for the associated UE; and the second message the NSACF entity is sent in response to determining that the first message is the first data connection for the associated UE.

Q. The network entity of any of K-P, wherein the code is further executable by the processor to send a third message the NSACF entity requesting an increase of the number of PDU sessions with the network slice associated with the network slice (S-NSSAI).

R. A method of a network slice admission control function (e.g. NSACF) in a communication network performing network slice admission control (NSAC) for at least one of maximum number of UEs or maximum number of Sessions, the method comprising the following steps receiving a request (e.g. from a requesting NF, like AMF, SMF or SMF+PGW-C) including an indication for at least one of: core network type or access type used by a device (e.g. UE) to register with a network slice (e.g. S-NSSAI), determining whether to accept or reject request considering the core network type or access type used currently by the UE: and sending a reply (e.g. to the requesting NF, like AMF, SMF or SMF+PGW-C) including a result whether the request is accepted or rejected.

S. The method of R, wherein in case of step c) is a rejection, then the reject reply includes a reject cause for a specific 'core network type' or for a specific 'access type' or both.

T. A method of a device (e.g. UE) registering with or establishing a data session to a communication network performing network slice admission control (NSAC) for at least one of maximum number of UEs or maximum number of sessions. The method comprises receiving a reject message for a particular S-NSSAI including a reject cause indicating that the network slice (S-NSSAI) rejection is due to NSAC and, in addition, to which access type and/or which core network type the rejection applies and determining to not send further requests for registration or establishing data sessions to this S-NSSAI over the same access type and/or which core network type.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a network entity, the method comprising:

receiving a first message requesting to establish or release a protocol data unit (PDU) session for a user equipment (UE), wherein the first message is received from a source network entity;

determining to perform a network slice availability check procedure to increase or decrease a number of PDU sessions for a network slice; and sending a second message to a network slice access control function (NSACF) entity requesting to increase or decrease the number of PDU sessions for the network slice, wherein the second message comprises an access type parameter, wherein the network slice being subject to admission control for a maximum number of PDU sessions, wherein the access type comprises:

a 3GPP access type responsive to the first message sent by the source network entity being a serving gateway (SGW) entity; and a non-3GPP access responsive to the first message sent by an evolved packet data gateway (ePDG) entity; and wherein the access type further comprises the access type parameter received in the first message sent by the source network entity being an access and mobility management function (AMF) entity.

2. The method of claim 1, wherein determining is further responsive to the source network entity being disposed in an evolved packet core (EPC).

3. The method of claim 1, wherein a core network type comprises at least one of an evolved packet core (EPC) or a 5G core (5GC).

4. The method of claim 1, further comprising determining not to send the second message to increase the number of PDU sessions for the network slice identified by the network slice (S-NSSAI) if there is already an existing PDU session for the UE for the same access type.

5. The method of claim 1, further comprising:

receiving a reject message for the UE from the NSACF entity, the reject message including an indication as to which access type or core network type the rejection applies; and sending the reject message to the UE with the indication as to which access type or core network type the rejection applies.

6. The method of claim 1, further comprising:

determining if the first message is a first data connection for the UE;

wherein sending the second message to the NSACF entity is performed in response to determining that the first message is the first data connection for the UE.

7. The method of claim 1, further comprising sending a third message to the NSACF entity requesting an increase of the number of PDU sessions established in the network slice.

8. The method of claim 7, wherein the third message is sent to the NSACF entity in response to the source network entity being disposed in an evolved packet core (EPC) and the network slice being subject to admission control for a maximum number of PDU Sessions.

9. The method of claim 7, wherein the third message includes at least one of a core network type parameter or an access type parameter, both used currently by the UE to establish the PDU session.

10. The method of claim 1, wherein the NSACF tracks a number of PDU sessions for the network slice for UEs registered via EPC separately than a number of PDU sessions for the network slice for UEs registered via 5GC.

11. A network entity, comprising:

at least one memory; and at least one processor coupled with the at least one memory and configured to cause the network entity to:

receive a first message requesting to establish or release a protocol data unit (PDU) session for a user equipment (UE), wherein the first message is received from a source network entity;

determine to perform a network slice availability check procedure to increase or decrease a number of PDU sessions for a network slice; and send a second message to a network slice access control function (NSACF) entity requesting to increase or decrease the number of PDU sessions for the network slice, wherein the second message comprises an access type parameter, wherein the network slice being subject to admission control for a maximum number of PDU sessions, wherein the access type comprises:

a 3GPP access type responsive to the first message sent by the source network entity being a serving gateway (SGW) entity; and a non-3GPP access responsive to the first message sent by an evolved packet data gateway (ePDG) entity; and wherein the access type further comprises the access type parameter received in the first message sent by the source network entity being an access and mobility management function (AMF) entity.

12. The network entity of claim 11, wherein the NSACF tracks a number of PDU sessions for the network slice for UEs registered via EPC separately than a number of PDU sessions for the network slice for UEs registered via 5GC.

13. The network entity of claim 11, wherein determining is further responsive to the source being disposed in an evolved packet core (EPC).

14. The network entity of claim 11, wherein the at least one processor is configured to cause the network entity to:

receive a reject message for the UE from the NSACF entity, the reject message including an indication as to which access type or core network type the rejection applies; and send the reject message to the UE with the indication as to which access type or core network type the rejection applies.

15. The network entity of claim 11, wherein:

the at least one processor is configured to cause the network entity to send a third message to the NSACF entity requesting an increase of the number of PDU sessions established in the network slice;

the third message is sent to the NSACF entity in response to the source network entity being disposed in an evolved packet core (EPC) and the network slice being subject to admission control for maximum number of PDU Sessions; and the third message includes at least one of a core network type parameter or an access type parameter, both used currently by the UE to establish the PDU session.

16. The network entity of claim 11, wherein a core network type comprises at least one of an evolved packet core (EPC) or a 5G core (5GC).

17. The network entity of claim 11, wherein the at least one processor is configured to cause the network entity to determine not to send the second message to increase the number of UEs for the network slice identified by the network slice (S-NSSAI) if there is already an existing data session for the UE.

18. The network entity of claim 11, wherein the at least one processor is configured to cause the network entity to send a third message to the NSACF entity requesting an increase of the number of PDU sessions established in the network slice.

19. The network entity of claim 18, wherein the third message is sent to the NSACF entity in response to the source network entity being disposed in an evolved packet core (EPC) and the network slice being subject to admission control for a maximum number of PDU Sessions.

20. The network entity of claim 18, wherein the third message includes at least one of a core network type parameter or an access type parameter, both used currently by the UE to establish the PDU session.

* * * * *